United States Patent [19]
Beaupre et al.

[11] Patent Number: 5,890,952
[45] Date of Patent: Apr. 6, 1999

[54] METAL FINISHING APPARATUS AND PROCESS

[75] Inventors: Michael E. Beaupre, North Olmsted; John S. Hadgis, Wellington, both of Ohio

[73] Assignee: Areway, Inc., Brooklyn, Ohio

[21] Appl. No.: 829,981

[22] Filed: Apr. 1, 1997

[51] Int. Cl.$^6$ ..................................................... B24B 5/44
[52] U.S. Cl. ............................................. 451/59; 451/168
[58] Field of Search .................... 451/59, 168, 169, 451/209, 244, 258, 302, 904, 331, 268, 339, 254

[56] References Cited

U.S. PATENT DOCUMENTS

| | | | |
|---|---|---|---|
| 3,593,461 | 7/1971 | Gay | 451/258 |
| 4,532,665 | 8/1985 | Evans et al. | 451/258 |
| 4,736,475 | 4/1988 | Ekhoff | 451/302 |
| 5,209,021 | 5/1993 | Christie et al. | 451/258 |

*Primary Examiner*—Robert A. Rose
*Attorney, Agent, or Firm*—Renner, Otto, Boisselle & Sklar, P.L.L.

[57] ABSTRACT

Apparatus and process for automated or semi-automated abrasive satin finishing of large machined annular parts such as aluminum vehicle wheels includes a loading area where the type of part and set-up position are verified, and a working area to which the verified part is transferred. When at the working area, the part is supported for rotation at an intermediate portion of the part to permit both sides of the part to be finished simultaneously while the part is being rotated.

26 Claims, 2 Drawing Sheets

METAL FINISHING APPARATUS AND PROCESS

BACKGROUND OF THE INVENTION

This invention relates to a metal finishing apparatus and process especially for automated abrasive satin finishing of large machined aluminum vehicle wheels or other annular metal parts.

Manual or semi-automatic wheel finishing machines are generally known. However, normally one side of the part is used for positioning and clamping the part while the other side is being finished, whereby only one side of the part can be finished at a time. Accordingly, there is a need for an apparatus which will permit uniform finishing of both sides of the part simultaneously at a high production rate, with minimum operator intervention.

SUMMARY OF THE INVENTION

In accordance with one aspect of the invention, a metal finishing apparatus and process are provided which permit both sides of a part to be finished simultaneously.

In accordance with another aspect of the invention, the apparatus includes a loading area at which critical surfaces of the part are measured against pre-programmed values to verify the type of part and that the set-up position of the part is correct.

In accordance with another aspect of the invention, the part is restrained in the loading area by an idler roller which, when withdrawn, permits the verified part to roll with controlled gravity to a working area where the part is stopped against a similar idler roller.

In accordance with another aspect of the invention, a uniform radial pattern satin finish may be applied to both sides of the part while the part is rotated at the working area.

In accordance with another aspect of the invention, the metal finishing operation may be used to provide uniform edge radiusing over holes in the part and/or finishing of a groove area in the part.

In accordance with another aspect of the invention, during the finishing cycle for one part, another part of the same size and style can be loaded at the loading area and size verified in readiness for the next finishing cycle.

In accordance with another aspect of the invention, after the metal finishing cycle, rotation of the finished metal part is decelerated to a stop and the drive rollers that rotate the part and downstream idler support roller are retracted to allow the finished part to roll with controlled gravity motion to a fixed stop position at an unloading area where the part may be pivoted onto an exit conveyor for discharge from the apparatus.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

DETAILED DESCRIPTION OF THE PREFERRED EMBODIMENT

Figure 1:
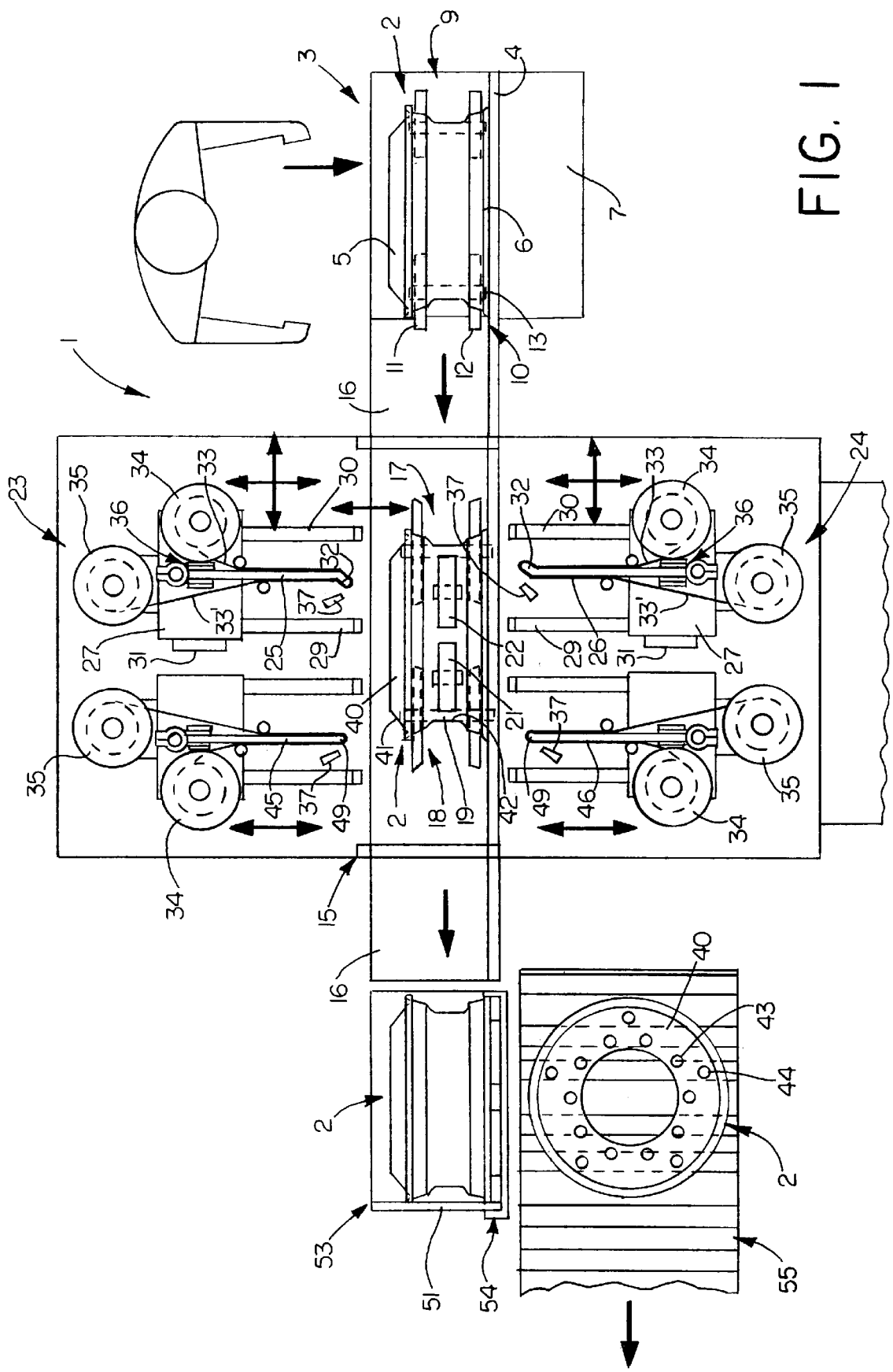
FIG. 1 is a schematic top plan view of a preferred form of metal finishing apparatus in accordance with the present invention.

Referring now in detail to the drawings, and initially to FIG. 1, there is schematically shown a preferred form of metal finishing apparatus 1 in accordance with this invention which provides for the automated or semi-automated abrasive satin finishing of both sides of large machined annular metal parts 2 simultaneously. The apparatus 1 is particularly adapted for automated abrasive satin finishing of both sides of large machined aluminum vehicle wheels simultaneously at a high production rate, with minimum operator intervention.

At one end of the apparatus 1 is a loading area 3 at which the wheels or other annular parts 2 are loaded either manually or using a separate lifting apparatus, not shown. During the loading cycle, the wheels are set against a fixed mechanical stop support 4 with the face 5 of the wheel 2 preferably facing to the front of the loading area and the open side 6 of the wheel facing the rear of the loading area.

Figure 2:
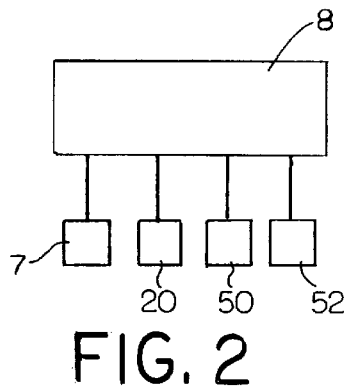
FIG. 2 is a schematic illustration of a system controller for the apparatus of FIG. 1.

It is important always to position the wheel or other part in the same orientation at the loading area so that a suitable measuring device 7 such as air operated probes may be used automatically to measure critical surfaces of the wheel shape and verify the type of part against pre-programmed values in a system controller 8, schematically shown in FIG. 2, to verify the type of part and that the set-up position of the part is correct. If the type of part and set-up position are verified as correct, the finishing cycle will continue. If not, the apparatus will go into a hold condition and signal the operator of a fault condition.

Another benefit in having the face 5 of the wheel 2 facing outward is that after the wheel has been finished and moved to the exit end of the apparatus, the wheel can readily be tilted/pivoted onto an exit conveyor with the open side of the wheel facing downwardly. This is the desired orientation of the wheel when for example the wheel is moved through a washer during a succeeding operation.

A pair of lower rubberized idler rollers 9, 10 are desirably provided for locating and supporting each part 2 at the loading area 3. Preferably, each idler roller comprises a pair of split wheels 11, 12, one of which is fixed on a shaft 13, and the other of which is adjustable along the length of the shaft for supporting different width parts.

When a correct and verified set-up of the part 2 at the loading area has been established, the part may be advanced from the loading area to an adjacent working area 15 by lowering the downstream idler roller 10 at the loading area. This allows the verified part to roll with controlled gravity motion along an inclined support surface 16 to the working area, where it may be stopped by a raised downstream roller 18 of a second pair of lower rubberized idler rollers 17, 18.

Figure 3:
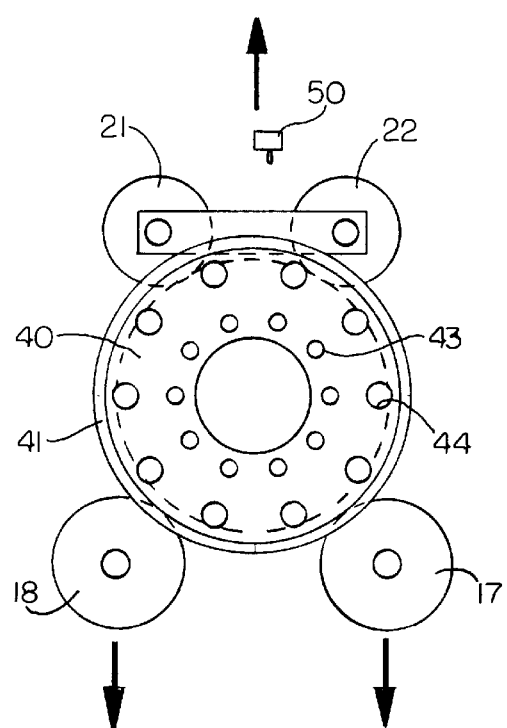
FIG. 3 is an enlarged schematic side elevation view of the idler support rollers and drive rollers for supporting and rotating the part at the working area.

The upstream roller 17 of the second pair of idler rollers is retracted until the part 2 passes over the upstream idler roller at the working area. Then the upstream idler roller 17 at the working area is raised so that both idler rollers 17, 18 engage an intermediate portion of the part, in this case the tire mounting area 19 of the wheel 2 to provide proper orientation and support of the wheel in the working area. This may be sensed by an electric sensor 20, schematically illustrated in FIG. 2, which signals two upper rubberized electric motor driven rollers 21, 22 to lower with a predetermined pressure against the tire mounting area of the part as schematically shown in FIG. 3. On command, the motor driven rollers 21, 22 start to rotate the part with frictional drive to a controlled preset process speed which is maintained at or near a constant finishing surface speed depending on the final finish desired. The working area 15 may be housed in a safety metal enclosure assembly with service access doors, drip pan, and connections for ventilation as required.

Adjacent opposite sides of the part 2 at the working area 15 are suitable metal finishing tools which may, for example, be robots, grinding wheels, and/or polishing wheels and the like. In the preferred form of the invention disclosed herein, the finishing tools 23, 24 comprise at least one primary abrasive media carrying arm 25, 26 adjacent each side of the part. Each arm 25, 26 is shown mounted on a slide 27 supported by a pair of axially oriented guide rods 29, 30 for axial movement of the arms toward and away from the part. Also, the slides 27 may be mounted on cross slides 31 for radial movement of the arms relative to the part.

At the outer ends of the arms 25, 26 are pads 32 about which a strip of abrasive media 33 is wrapped. A supply of the abrasive media 33 is stored on a spool 34 rotatably mounted on each slide. The abrasive media is fed out from the spool 34, over the pads 32 on the arms, and taken up by another spool 35 rotatably mounted on each slide. A predetermined amount of fresh abrasive media strip material 33 advances from the first spool 34 over the pad 32 of each arm 25, 26, with the used abrasive strip material 33' being taken up by the second spool 35. The abrasive strip material is held tight up against the pads 32 during the polishing operation, and may be advanced slowly during polishing, or a predetermined amount of fresh abrasive strip material 33 may be advanced over the pads at each indexing/retraction of the arms as described hereafter.

As the part 2 nears its predetermined work rotation speed, the abrasive media carrying arms 25, 26 fast approach the part under hydraulic cylinder control from each side of the part, or if selected, from one side only to a preset part position. The arms are preloaded by springs 36 which keep the pads on the arms in contact with the part during polishing. The articulating arms effectively trace the walls of the part being polished under a constant floating pressure and speed to apply a linear uniform abrasive satin finish across the entire surface of the part. During the finishing process, small nozzles 37 near the abrasive contact points apply a mist lubricant under position and timer control.

The primary arm 25 at the front side of the working area polishes the exterior face of the wheel 2 including particularly the face 40 and lip 41, whereas the primary arm 26 at the back side of the working area polishes the entire interior surface of the part including the inside of the face 40 and the inner wall 42 of the part.

Relatively small lug holes 43 may be provided in the wheel face 40 as schematically shown in FIG. 3. Also, larger lighting holes 44 may be provided in the wheel face 40 to take some weight out of the wheels and to give the wheels some styling.

To provide uniform edge radiusing over such holes, when one pass of the primary polishing arms is complete, the part direction is reversed and a second pass of the primary polishing arms is made over the same area with the same speed and pressure. The arms then traverse to the outer edges of the part surface and retract under accelerated speed to the original start position, waiting for the next part cycle.

Figure 4:
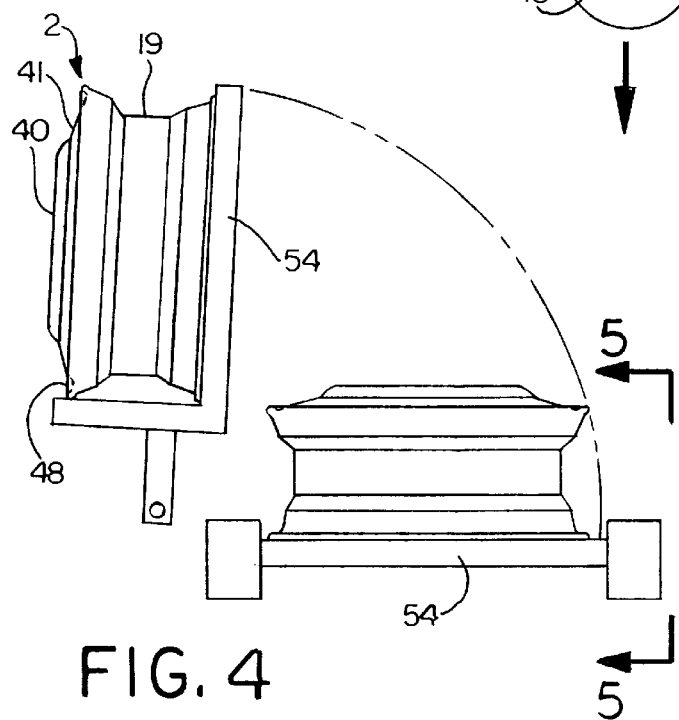
FIG. 4 is an enlarged schematic side elevation view showing the tilting device that is used to move the part from the unloading areas of the apparatus onto an exit conveyor with the open side of the part facing downwardly.

One or more secondary abrasive media carrying arms 45, 46 may also be provided adjacent each side of the part at the working area 15 for performing secondary finishing operations, for example, for finishing a groove area 48 near the lip 41 of the part (see FIG. 4). In this particular case, the secondary finishing arms 45, 46 need only extend and retract to move the associated abrasive pads 49 axially into and out of engagement with the groove area. Thus, no cross motion need be provided for the secondary arms.

As soon as all of the arms 25, 26 and 45, 46 begin the fast retract mode, the part rotation decelerates to a stop and a predetermined amount of fresh abrasive 33 may be advanced from the spools 34 over the contact pad area of each arm, with the used abrasive 33' being taken up by the secondary spools 35.

Figure 5:
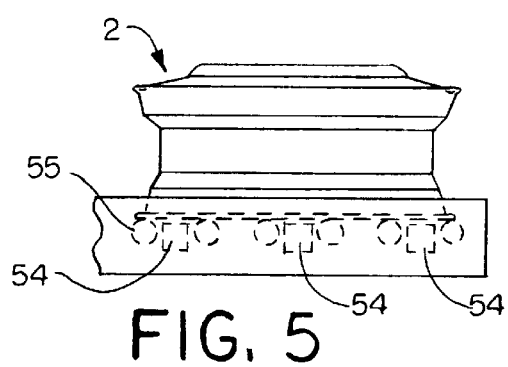
FIG. 5 is an end elevation view of the tilting device and exit conveyor of FIG. 4 as seen from the plane of the line 5—5 thereof.

After the finished part 2 has come to a complete stop, the upper driving rollers 21, 22 are retracted away from the part to the original starting position and remain there until the next cycle. When the driving rollers are fully retracted as verified by a sensor 50 (see FIGS. 2 and 3), the downstream bottom idler roller 18 is lowered to allow the finished part 2 to roll with controlled gravity motion along the inclined surface 16 away from the working area 15 to a fixed stop position 51 at the exit end of the apparatus where a sensor 52 (see FIG. 2) verifies that the part is in the unloading area 53. At this time, an automatic tilting device 54 tilts or pivots the part 2 onto an exit conveyor 55 with the open side 6 of the part facing down as schematically illustrated in FIGS. 1, 4 and 5. Alternatively, the part 2 can be manually unloaded from the unloading area 53 and moved to another operation as desired.

While one part is being finished in the working area 15, another part of the same size and style can be loaded at the loading area 3 and size verified in readiness for the next style. If the same size and style part is to be continued to be finished, as soon as the finished part leaves the working area 15, the next part is advanced from the loading area 3 to the working area 15 and finished as before. If a different size or style of part is to be finished next, the apparatus 1 requires a manual set-up adjustment, and new checking cycle parameters may be called up from the system controller 8 at the operator's console.

Although the invention has been shown and described with respect to a certain preferred embodiment, it is obvious that equivalent alterations and modifications will occur to others skilled in the art upon the reading and understanding of the specification. The present invention includes all such equivalent alterations and modifications and is limited only by the scope of the claims.

What is claimed is:

1. Apparatus for finishing a surface of an annular metal part comprising a loading area for setting the part up, means for measuring critical surfaces of the part after set-up and verifying the type of part against pre-programmed values in a controller to verify the type of part and set-up position at said loading area, and a working area downstream of said loading area for receiving the part after verification at the loading area, said working area including roller supports engageable with an intermediate portion of the part for supporting the part for rotation, and metal finishing tools adjacent opposite sides of the part for performing finishing operations on opposite sides of the part simultaneously while the part is being rotated.

2. Apparatus for finishing a surface of an annular metal part comprising a loading area where the type of part and set-up position are verified, and a working area downstream of said loading area for receiving the part after verification at the loading area, said working area including roller supports engageable with an intermediate portion of the part for supporting the part for rotation, and metal finishing tools adjacent opposite sides of the part for performing finishing operations on opposite sides of the part simultaneously while the part is being rotated, said roller supports at said working area comprising a pair of lower idler rollers which engage an intermediate portion of the part for supporting the part for rotation, and upper driving rollers movable into engagement with the intermediate portion of the part with a predetermined pressure for rotating the part to a controlled preset process speed.

3. The apparatus of claim 2 further comprising other roller supports for supporting the part at the loading area.

4. The apparatus of claim 3 further comprising an inclined supporting surface extending between said loading area and said working area, said other roller supports at said loading area including a downstream idler roller which is downwardly movable to permit the part to roll with controlled gravity from said loading area to said working area.

5. The apparatus of claim 4 wherein an upstream idler roller at said working area is downwardly movable to permit the part to pass over the upstream idler roller and stop against a downstream idler roller when in a raised position at said working area.

6. The apparatus of claim 5 further comprising an unloading area downstream of said working area, said inclined supporting surface also extending to said unloading area, said driving rollers being movable out of engagement with the part and the downstream idler roller at said working area being downwardly movable to permit the part to roll with controlled gravity from the working area to the unloading area.

7. The apparatus of claim 6 further comprising a fixed stop for locating the part at the unloading area, an exit conveyor adjacent the unloading area, and a tilting device for tilting the part at the unloading area onto the exit conveyor.

8. The apparatus of claim 1 wherein said metal finishing tools comprise primary finishing tools for performing primary finishing operations on the part, said primary finishing tools being axially movable toward and away from opposite sides of the part and also radially movable relative to the part.

9. The apparatus of claim 8 wherein said primary finishing tools comprise abrasive media carrying arms mounted on slides for axial movement of the arms toward and away from opposite sides of the part, and said slides being mounted on cross slides for radial movement of the arms relative to the part.

10. The apparatus of claim 9 wherein said arms have pads at one end about which strips of abrasive media are wrapped.

11. The apparatus of claim 10 further comprising a first spool carried by each slide for storing a supply of the abrasive media, and a second spool carried by each slide for taking up the strip of abrasive media as the abrasive media is used up.

12. The apparatus of claim 8 wherein the part includes a face having an exterior surface, and an open side opposite the face, further comprising means for causing one of said primary finishing tools to pass over the face of the part one or more times to finish the face, and means for causing an other of said primary finishing tools to move into the open side of the part for finishing the interior of said face and the inner walls of the part simultaneously during the finishing of the exterior surface of the face.

13. Apparatus for finishing a surface of an annular metal part comprising a loading area where the type of part and set-up position are verified, and a working area downstream of said loading area for receiving the part after verification at the loading area, said working area including roller supports engageable with an intermediate portion of the part for supporting the part for rotation, and metal finishing tools adjacent opposite sides of the part for performing finishing operations on opposite sides of the part simultaneously while the part is being rotated, said metal finishing tools comprising primary finishing tools for performing primary finishing operations on the part, said primary finishing tools being axially movable toward and away from opposite sides of the part and also radially movable relative to the part, and secondary finishing tools at the working area circumferentially spaced from the primary finishing tools for performing secondary finishing operations on the part simultaneously during the primary finishing operations.

14. The apparatus of claim 13 wherein said secondary finishing tools are mounted on slides for axial movement toward and away from opposite sides of the part.

15. A process for finishing the surface of an annular metal part comprising the steps of positioning the part at a loading area, verifying the type and set-up of the part at the loading area, transferring the verified part from the loading area to a working area downstream of the loading area, rotating the part at the working area while the part is being supported at an intermediate portion of the part, leaving opposite sides of the part exposed for finishing, and while the part is being rotated, simultaneously finishing opposite sides of the part, and loading another part at the loading area and verifying the size and style of the part at the loading area while a previously loaded part is being finished at the working area.

16. The process of claim 15 wherein the part is supported by a first pair of rollers at the loading area, a downstream one of which is downwardly movable to permit the part at the loading area to roll down an inclined supporting surface with controlled gravity to the working area.

17. The process of claim 16 wherein the part is supported at the working area by another pair of rollers, an upstream one of which is moved downwardly when the downstream roller at the loading area is lowered to permit the part to pass over the upstream roller at the working area and come to a stop against a downstream roller at the working area.

18. The process of claim 17 wherein the upstream roller at the working area is raised after the part comes to a stop against the downstream roller at the working area to engage the part at an intermediate portion of the part for supporting the part for rotation, and the part is then rotated at a controlled preset process speed while finishing tools adjacent opposite sides of the part make one or more passes of the part.

19. The process of claim 18 wherein as the part nears its preset process speed, the finishing tools are caused to fast approach the part from opposite sides, or if selected, from one side only to a preset part position.

20. The process of claim 19 wherein the finishing tools are caused to trace the walls of the part being finished under a constant floating pressure and speed to apply a linear uniform finish across the entire face of the part during the finishing step.

21. The process of claim 20 wherein after one pass of the finishing tools across the part, the part direction is reversed and another pass of the finishing tools is made over the same area of the part with the same speed and pressure to provide uniform radius finishing over holes in the face of the part.

22. The process of claim 19 wherein after the finishing tools have made the desired number of passes to finish the part, the finishing tools are retracted under accelerated speed to an original start position.

23. The process of claim 22 further comprising the step of bringing the finished part to a stop and transferring the finished part to an unloading area downstream of the working area.

24. The process of claim 23 wherein a drive roller is moved into frictional contact with the intermediate portion of the part to rotate the part, and prior to transferring the finished part to the unloading area, the drive roller is moved out of engagement with the finished part and the downstream roller at the working area is lowered to permit the finished part to roll down an inclined supporting surface with controlled gravity to the unloading area.

25. The process of claim 23 further comprising the step of pivoting the finished part when at the unloading area onto an exit conveyor adjacent the unloading area.

26. A process for finishing the surface of an annular metal part comprising the steps of setting the part up at a loading area, measuring critical surfaces of the part after set-up and verifying the type of part against pre-programmed values in a process controller to verify the type of part and set-up position at the loading area, transferring the verified part from the loading area to a working area downstream of the loading area, rotating the part at the working area while the part is being supported at an intermediate portion of the part, leaving opposite sides of the part exposed for finishing, and while the part is being rotated, simultaneously finishing opposite sides of the part.

\* \* \* \* \*